United States Patent
Holbrook et al.

(10) Patent No.: US 7,427,320 B2
(45) Date of Patent: Sep. 23, 2008

(54) INK COMPOSITIONS CONTAINING ETHYLENE GLYCOL MONOBUTYL ETHER

(75) Inventors: Mark Holbrook, Manchester (GB); Shakila Yusuf, Manchester (GB); Vicky Riding, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 187 days.

(21) Appl. No.: 11/366,820

(22) Filed: Mar. 3, 2006

(65) Prior Publication Data

US 2006/0197816 A1    Sep. 7, 2006

(30) Foreign Application Priority Data

Mar. 7, 2005    (GB) ................... 0504640.4

(51) Int. Cl.
*C09D 11/02*    (2006.01)

(52) U.S. Cl. .................. 106/31.86; 106/31.75

(58) Field of Classification Search ............... 106/31.86
See application file for complete search history.

(56) References Cited

U.S. PATENT DOCUMENTS

| | | | |
|---|---|---|---|
| 3,687,887 A | 8/1972 | Zabiak | ............... 260/29.6 WB |
| 4,378,564 A | 3/1983 | Cross et al. | |
| 4,545,818 A | 10/1985 | Inoue et al. | .................... 106/22 |
| 5,281,261 A | 1/1994 | Lin | ........................... 106/20 R |
| 5,376,169 A | 12/1994 | Hotomi et al. | ................ 106/23 |
| 6,802,893 B1 * | 10/2004 | Komatsu et al. | ........... 106/31.6 |

FOREIGN PATENT DOCUMENTS

| | | |
|---|---|---|
| EP | 0 514 159 A1 | 11/1992 |
| EP | 0 735 120 A2 | 10/1996 |
| EP | 0 761 783 A2 | 3/1997 |
| JP | 63165470 A | 11/1987 |
| JP | 2001-207089 A | 7/2001 |

* cited by examiner

*Primary Examiner*—Jerry Lorengo
*Assistant Examiner*—Veronica Faison Gee
(74) *Attorney, Agent, or Firm*—Morgan, Lewis & Bockius LLP

(57) ABSTRACT

An ink composition comprising:
a) 5 to 30 parts ethylene glycol mono butyl ether;
b) 0 to 40 parts diethylene glycol mono butyl ether and/or triethylene glycol mono butyl ether;
c) 0.1 to 20 parts pigment; and
d) 20 to 84.9 parts water;
wherein the ink has a viscosity of less than 50 mPa·s at a temperature of 25° C., the sum of the parts of components a)+b) is no less than 15, the sum of the parts of components a) to d) equals 100 and all parts are by weight. The inks are particularly suitable for use as ink jet printing inks and have good print quality, latency and dry time characteristics.

19 Claims, No Drawings

INK COMPOSITIONS CONTAINING ETHYLENE GLYCOL MONOBUTYL ETHER

This invention relates to ink compositions and especially ink jet printing ink compositions. It also relates to a process for printing these ink compositions, to ink jet printer cartridges containing these ink compositions and to substrates printed with these ink compositions.

Ink jet printing (IJP) is a non-impact printing technique in which droplets of ink are ejected through a fine nozzle onto a substrate without bringing the nozzle into contact with the substrate. The demanding performance requirements for ink jet printers and the inks used in these printers poses difficult challenges for the ink industry. Ink jet printers are generally required to fire a large number of fine droplets of ink through tiny nozzles onto a substrate. Maintaining good print quality during such printing is difficult. It is especially difficult to reliably print over long print runs. The problem of printing reliably is often referred to as operability. Poor operability can result in prints which, for example, show missing lines of the image or in more pronounced cases result in a substantial failure to print an image.

IJP inks typically comprise a liquid medium and a colorant (such as a pigment and/or dye). The liquid medium is often aqueous and typically comprises significant amounts of water. IJP inks comprising a pigment as the colorant offer several advantages over those comprising a dye. In particular, pigment based inks give rise to prints with better light fastness and higher optical density.

In general, good operability is more difficult to achieve in inks wherein the colorant is a pigment when compared to inks wherein the colorant is a dye. Difficulties in adequately maintaining the stability of the pigment dispersion in the ink are often regarded as being a major cause of poorer operability. Flocculation and/or aggregation of the pigment dispersion in the ink may tend to block the ink jet printer nozzles and result in problems in reliably firing the ink from the nozzle.

The manufacturers of ink jet printers have sought to increase print speeds. Increasing print speed often means that the ink jet ink should desirably dry more quickly such that the final print does not smudge when stacked. Inks demonstrating reduced drying times can be achieved by, for example, using volatile liquids in place of some of the water in the liquid medium.

Inks with a quicker drying time, however, often result in an increased tendency for the ink to dry on the nozzles whilst the printer is not actively printing. Ink dried on nozzles tends cause a difficulty in properly printing again after periods of rest. Nozzles may become blocked, may fire intermittently or may fire improperly. This kind of operability problem is more specifically referred to as latency.

Further to this, the presence of volatile liquids in the liquid medium of the ink may tend to destabilise a pigment dispersion in the ink. The destabilisation may arise as a result of replacing some of the water with a volatile liquid which is less effective than water at stabilising the pigment dispersion. The destabilisation may also arise as a result of changes in the composition of the liquid medium as the volatile liquid is evaporated from the ink jet nozzles. Such destabilisation is especially pronounced where the amount of volatile liquid is sufficient to give rise to a significant reduction in the drying time of the ink and therefore an increase in printing speed. This destabilisation may be exhibited by aggregation and/or flocculation of the pigment which may itself result in the aforementioned operability problems.

EP 0,761,783 discloses IJP inks comprising pigment, water and a glycol ether, wherein the pigment has specific groups bonded to its surface and the glycol ether is diethylene glycol mono-n-butyl ether, triethylene glycol mono-n-butyl ether, propylene glycol mono-n-butyl ether, dipropylene glycol mono-n-butyl ether or a mixture of two or more said glycol ethers.

U.S. Pat. No. 4,378,564 discloses IJP inks comprising a dye and a mixture of butyl cellosolve and butyl carbitol.

JP 2001-207089 discloses aqueous IJP inks comprising a self-dispersible carbon black, at least one butyl glycol and at least one pyrrolidone.

EP 0,735,120 discloses IJP inks comprising, among other things; water, a colorant having an infrared absorption in the range of 700 to 1100 nm and at least one mono or dialkyl ether of an alkylene glycol having 2 to 6 carbon atoms wherein the alkyl group consists of 1 to 6 carbon atoms.

Whilst the inks disclosed in the above prior art offer some advantages none simultaneously offer good operability (especially good latency), good print quality and are fast drying.

Accordingly, there is a need to provide an ink composition which simultaneously solves or reduces the aforementioned problems.

According to a first aspect of the present invention there is provided an ink composition comprising:
  a) 5 to 30 parts ethylene glycol mono butyl ether;
  b) 0 to 40 parts diethylene glycol mono butyl ether and/or triethylene glycol mono butyl ether;
  c) 0.1 to 20 parts pigment; and
  d) 20 to 84.9 parts water;

wherein the ink has a viscosity of less than 50 mPa·s at a temperature of 25° C., the sum of the parts of components a)+b) is no less than 15, the sum of the parts of components a) to d) equals 100 and all parts are by weight.

Ethylene glycol mono butyl ether (hereinafter EGBE) is available from a range of suppliers under trade names such as Butyl cellosolve™ (from DOW), Ektasolve™ EB, Jeffersol™ EB and poly-solv™ EB.

In the case where the amount of component b) is 0, component a) is preferably from 15 to 30 parts and more preferably from 15 to 25 parts by weight.

In the case where the amount of component b) is not 0, component a) is preferably from 5 to 25 parts and more preferably from 5 to 20 parts by weight.

Diethylene glycol mono butyl ether (hereinafter DGBE) is available from a range of suppliers under trade names such as Butyl carbitol™ (from DOW), Ektasolve™ DB, Jeffersol™ DB and poly-solv ™ DB.

Triethylene glycol mono butyl ether (hereinafter TGBE) is available from a range of suppliers under trade names such as Butoxytriglycol™ (from DOW) Eastman DTE™ solvent (from Eastman chemicals), glycol ether TE™, poly-solv TB™.

Preferably the amount of component b) in the ink is from 1 to 40 parts, more preferably from 5 to 30 parts and especially from 10 to 20 parts.

Component b) preferably comprises DGBE, more preferably component b) is only DGBE.

Preferably, the sum of the amounts of components a) and b) is no less than 20, more preferably the sum is from 20 to 60, especially from 20 to 50 and more especially from 20 to 40 parts by weight. In these cases the amount of component d) is from 20 to 79.9 parts.

We have found that ink compositions having certain weight ratios of component a) to b) are especially suitable as ink jet printing inks as they have especially good operability and latency characteristics. Preferably, the ratio of parts of component a) to component b) is from 1:1 to 1:10, more preferably from 1:1 to 1:7, especially from 1:1 to 1:5 and more especially from 1:1.2 to 1:3 by weight.

The pigment may be any colorant or mixture thereof which is substantially insoluble in the ink composition. By substantially insoluble with regard to pigment, it is meant that small amounts (e.g. less than 1% by weight) of the pigment may be soluble.

The pigment may be an organic pigment or an inorganic pigment.

Suitable organic pigments include, for example, any of the classes of organic pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments and indanthrone, anthranthrone and quinacridone pigments.

Suitable inorganic pigments include, for example inorganic oxides (especially zinc, silicon, chromium, manganese, iron, cobalt and titanium); inorganic sulphides; metal particles such as gold and silver colloids. Carbon black is an especially preferred inorganic pigment.

Preferably the pigment has a cyan, magenta, yellow or more preferably a black colour.

The pigment may require a dispersant to effect adequate dispersion in the ink composition, however it is preferred that the pigment is self-dispersible in the ink (i.e. the pigment may be dispersed without the presence of a dispersant). More preferably the pigment is self-dispersible in water.

Preferred dispersants to aid pigment dispersion and stability are Disperbyk™ (available from Byk chem.), Solsperse™ (available from Lubrizol), Tego™ (available from Degussa. A preferred dispersant is Solsperse™ 27,000 available from Lubrizol.

Where a dispersant is present in the ink composition the ink composition preferably comprises from 50 to 200% by weight of dispersant based on the weight of the pigment.

Preferably, the ink composition is free from any dispersant and the pigment is self-dispersible. Self-dispersible pigments are generally chemically treated so as to provide stabilising groups which are typically covalently bonded to the pigment surface. Preferably, the pigment has sulfonic acid and more preferably carboxylic acid groups attached to the pigment surface.

Especially preferred are the self-dispersible pigments available from Cabot Corporation under the trade name Cab-O-Jet™. Preferred examples of self-dispersible pigments are; Cab-O-Jet™ 200, 250C, 260M and 270Y and especially 300.

Other suitable self-dispersible pigments are CW1 and CW2 available from Orient.

Preferably the amount of component c) is from 1 to 15, more preferably from 1 to 10 parts by weight.

Preferably the amount of component d) is from 30 to 80, more preferably from 40 to 80 and especially from 55 to 75 parts by weight. We have found that these amounts of water correspond to even better stability of the pigment dispersion and tend to enhance operability and latency. Water is often added to inks compositions from a number of sources for example pigment dispersions, surfactant solutions or dispersant solutions. The amount of water in d) relates to the total amount present in the ink including all such sources whether or not the addition of water is intentional.

In addition to components a) to d) the ink composition may further comprise optional cosolvents, penetrants and/or humectants suitable for use in IJP ink compositions.

In addition to components a) to d) the ink preferably comprises:
e) 0.1 to 20 parts of 2-pyrrolidone, N-methyl pyrrolidone, urea, ethylene glycol, glycerol and/or propylene glycol by weight, wherein the sum of the parts of components a) to e) is 100.

Preferably, component e) comprises 2-pyrrolidone, more preferably component e) is 2-pyrrolidone.

Preferably, the amount of component e) is from 1 to 15, more preferably from 1 to 10 and especially from 2 to 8 parts by weight.

Preferably, the ratio of amounts of components [a)+b)] to e) is from 1:1 to 8:1, more preferably 2:1 to 8:1, especially from 3:1 to 7:1 and more especially from 4:1 to 6:1 by weight. We have found that these ratios give rise to further improved operability and latency of the ink composition in ink jet printing.

In addition to components a) to d) and optionally e) the ink composition preferably comprises a binder. The binder may be any polymeric material which assists in binding the pigment to a substrate after the liquid components of the ink have been absorbed into and/or evaporated from a printed image. The binder may be any natural or synthetic polymer. Suitable examples of natural binders include proteins, celluloses, waxes and the like. Preferred synthetic binders are those comprising polyesters, polyurethanes and especially poly vinyl polymers. Preferably, the binder comprises a (meth) acrylate polymer, more preferably the binder is a (meth) acrylate polymer. Preferably, the binder has a number average molecular weight (Mn) of from 1,000 to 50,000. The binder may be present in the ink in the form of a colloidal phase (e.g. an emulsion) however it is preferred that the binder is present in the ink in the form of a solution. It is preferred that the binder is soluble in the ink when the ink has an alkaline pH but is insoluble when the ink has an acid pH. Such solubility is preferably achieved by the presence of acid groups and especially carboxylic acid groups in the binder. An especially preferred binder is Neocryl™ BT24 available from DSM.

One or more binders may be present in the ink composition.

The ink composition preferably comprises from 0.1 to 5 parts, more preferably from 0.5 to 4.0 parts by weight of binder.

The ink composition of the present invention is especially suitable for the incorporation of a binder whilst maintaining good operability and latency in ink jet printing. This is surprising as the presence of a binder often reduces the operability and latency of the ink.

In addition to components a) to d) and optionally e) the ink composition preferably comprises one or more surfactants. The surfactant may be ionic or non-ionic in nature. Especially preferred are those surfactants made from acetylenic diols (especially 2,4,7,9-tetramethyl-5-decyne-4,7-diol). Preferred examples of which are Surfynol™ 104E and 465 available from Air Products.

Preferably, the ink comprises from 0.01 to 5 parts and especially from 0.1 to 2 parts by weight of surfactant.

In addition to components a) to d) and optionally e) the ink composition may optionally comprise one or more additives suitable for inks and especially those suitable for IJP inks. Preferred additives suitable for IJP inks are pH adjusters and/or buffers, anti-kogation agents, biocides, rheology modifiers, corrosion inhibitors, chelating agents and dyes. Preferably, the total amount of all such additives is no more than 10 parts by weight.

A preferred ink composition comprises:
a) 5 to 30 parts, preferably 5 to 20 parts ethylene glycol mono butyl ether;
b) 1 to 40 parts, preferably 5 to 30 parts diethylene glycol mono butyl ether;

c) 0.1 to 20 parts, preferably 1 to 15 parts pigment;
d) 20 to 80 parts, preferably 40 to 80 parts water;
e) 0 to 20 parts, preferably from 1 to 10 parts 2-pyrrolidone, N-methyl pyrrolidone, urea and/or propylene glycol;

wherein the ink has a viscosity of less than 50 mPa·s at a temperature of 25° C., the sum of the parts of components a)+b) is no less than 15, the sum of the parts of components a) to e) equals 100 and all parts are by weight.

Preferably, the ink compositions are suitable for use as ink jet printing inks.

Preferably, the ink composition has a viscosity of less than 30 mPa·s, more preferably less than 20 mPa·s and especially less than 10 mPa·s at a temperature of 25° C.

A preferred method for measuring the viscosity is using a rotational viscometer available from Bohlin.

Preferably, the viscosity is measured at a rotational speed of 10 rpm, more preferably 5 rpm and especially 1 rpm. Preferably, the viscosity is newtownian, more preferably the viscosity as measured at rotational velocities of 10 and 100 rpm and substantially the same. By substantially it is meant that the viscosity as measured at 10 and 100 rpm should differ by no more than 10%.

Preferably, the ink composition has a surface tension of from 25 to 60 at a temperature of 25° C.

A preferred method for measuring the surface tension is by a DuNouy ring.

Preferably, the ink composition has been filtered through a filter having a mean pore size of less than 10 microns, more preferably less than 5 microns and especially less than 1 micron.

According to a second aspect of the present invention there is provided a process for printing an image on a substrate comprising applying an ink composition according to the first aspect of the present invention to the substrate, preferably by means of an ink jet printer.

According to a third aspect of the present invention there is provided a paper, a plastic film or a textile material printed with an ink composition according to the first aspect of the present invention, preferably by means of an ink jet printer. The paper may be plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

The plastic film may be opaque or transparent. Transparent plastic films which are suitable for use as overhead projector slides, include for example polyesters (especially polyethylene terephthalate), polycarbonates, polyimides, polystyrenes, polyether sulphones, cellulose diacetate and cellulose triacetate films.

The inks of the present invention are especially suitable for printing onto substrates having no or negligible absorbency or porosity. Such substrates include plastics, paper or card overcoated with, for example, a varnish. The varnish may be UV curable, solvent based or water based. We have surprisingly found that the ink composition according to the first aspect of the present invention demonstrates an advantageous tendency to retain an original printed shape even on non porous or non absorbing substrates. The ink compositions of the present invention are less prone to reticulate (drawing inwards) or wet (spreading outwards) on the substrate. Accordingly, printed characters and images of good quality are achievable even on such challenging substrates.

According to a fourth aspect of the present invention there is provided an ink jet printer cartridge comprising a chamber and an ink composition according to the first aspect of the present invention wherein said ink composition is present in the chamber.

The invention is further illustrated by the following Examples in which all parts and percentages are by weight unless otherwise stated.

PREPARATION OF INK COMPOSITIONS

Ink compositions I1 to I6 were prepared by mixing the components as indicated down the columns of Table 1 using the following process:
  i) the components a), b), d) and e) were mixed together along with any surfactants and dispersants;
  ii) the binder (BT24) was added to the resultant mixture from step i) with stirring;
  iii) the pH of the resultant mixture from step ii) was adjusted to 9.5 by the addition of aminomethyl propanol which dissolved the BT24 binder;
  iv) the resultant mixture from step iii) was then slowly added to a stirred dispersion containing Cab-O-Jet™ 300 as commercially supplied;
  v) after complete addition in step iv) the resultant ink composition was stirred for a further 30 minutes; and
  vi) the resultant pH of the ink composition in step v) was adjusted to 9.5 with aminomethyl propanol as necessary.

TABLE 1

| | | I1 | I2 | I3 | I4 | I5 | I6 |
|---|---|---|---|---|---|---|---|
| Component a) | Butyl Cellosolve ™ | 6.6 | 9 | 13 | 20 | 30 | 30 |
| Component b) | Butyl Carbitol ™ | 40 | 15 | 26 | 35 | | |
| Component c) Pigment | Cab-O-Jet ™ 300 | 20 | 20 | 20 | 20 | 20 | 20 |
| Component d) | Added Water | 9.99 | 46.09 | 27.59 | 15.09 | 26.59 | 26.59 |
| Component e) | 2-Pyrrolidone | | 5 | 10 | | 20 | 15 |
| Component e) | Propylene Glycol | 20 | | | | | |
| Component e) | Glycerol | | | | | 5 | |
| Binder | Neocryl ™ BT24 | 3.41 | 3.41 | 3.41 | 3.41 | 3.41 | 3.41 |
| Surfactant | Surfynol ™ 104E | | | | | 1.5 | |
| Surfactant | Surfynol ™ 465 | | 1.5 | | | | |

TABLE 1-continued

|  |  | I1 | I2 | I3 | I4 | I5 | I6 |
|---|---|---|---|---|---|---|---|
| Dispersant | Solsperse ™ 27000 |  |  |  |  |  | 5 |
|  | (Total Water Content) | 28.89 | 65.99 | 46.49 | 33.99 | 45.49 | 45.49 |

Cab-O-Jet ™ 300 is a carboxylic acid stabilised carbon black dispersion in water having a solids content of 15% by weight.
Neocryl ™ BT-24 is an acrylic polymer dispersion in water having a solids content of 44% by weight.
Surfynol ™ 104E is a non-ionic surfactant which is supplied by Air Products as a 50% by weight solution of the surfactant in ethylene glycol.
Surfynol ™ 465 is a non-ionic, low foam surfactant and is taken to be 100% active by weight.
Solsperse ™ 27,000 is an ethoxylated aromatic alcohol dispersant and is taken to be 100% active by weight.

Cab-O-jet™ 300 is a acid stabilised carbon black dispersion in water having a solids content of 15% by weight.
Neocryl™ BT-24 is an acrylic polymer dispersion in water having a solids content of 44% by weight.
Surfynol™ 104E is a non-ionic surfactant which is supplied by Air Products as a 50% by weight solution of the surfactant in ethylene glycol.
Surfynol™ 104E is a non-ionic, low foam surfactant and is taken to be 100% active by weight.
Solsperse™ 27,000 is an ethoxylated aromatic alcohol dispersant and is taken to be 100% active by weight.

The last row in Table 1 tabulates the water content present in the ink compositions once all the sources of water have been accounted for.

PREPARATION OF COMPARATIVE INK COMPOSITIONS

The Comparative ink compositions C1 to C4 were prepared in the same way as the ink compositions I1 to I6 except that the amounts were as indicated in the columns of Table 2.

TABLE 2

|  |  | C1 | C2 | C3 | C4 |
|---|---|---|---|---|---|
| Component a) | Butyl Cellosolve ™ | 2.5 | 2.5 | 2.5 | 35 |
| Component b) | Butyl Carbitol ™ |  | 8.5 | 15 |  |
| Component c) Pigment | Cab-O-Jet ™ 300 | 20 | 20 | 20 | 20 |
| Component d) | Added Water | 46.59 | 22.59 | 22.59 | 16.59 |
| Component e) | 2-Pyrrolidone |  |  |  | 20 |
| Component e) | Urea |  |  |  | 5 |
| Component e) | Diethylene glycol | 27.5 | 43 | 36.5 |  |
|  | (Total Water Content) | 65.49 | 41.49 | 41.49 | 35.5 |

The last row in Table 2 tabulates the water content present in the ink compositions once all the sources of water have been accounted for.

The comparative inks can be summarised as:

C1  The amount of EGBE is less than 5 parts, no component b) is present and the sum of the parts of components a) + b) is less than 15 parts.
C2  The amount of EGBE is less than 5 parts, component b) is present and the sum of the parts of components a) + b) is less than 15 parts.
C3  The amount of EGBE is less than 5 parts, component b) is present and the sum of the parts of components a) + b) is more than 15 parts.
C4  The amount of EGBE is more than 30 parts, no component b) is present and the sum of the parts of a) + b) is more than 15 parts.

TEST METHODS

A HP 45 ink jet printer cartridge (HP part No 51645) was filled with the ink composition to be tested. A high speed mail printer as supplied by, for example, MCS Inc of Gaithersburg MA was used to print the ink compositions.

Print speed tests were carried out on each ink composition using the mail printer as described above fitted with a 6 kW infrared drying unit. The best possible print speed was quantified by assessing the smudge resistance of the ink printed on non-porous, over-varnished, lithographic paper immediately after the prints left the drying unit. The smudge resistance was measured by rubbing a finger over the printed area whilst applying a downward pressure. At low print speeds all inks gave dry prints after exiting the drier unit with good smudge resistance. For each ink the printing speed was increased until smudging became apparent. This printing speed was recorded for each ink composition and is tabulated in Table 3. A faster print speed corresponds to a quicker drying time. Print speeds were recorded in feet per minute of the printed lithographic paper.

Latency tests were carried out on each ink using the mail printer described above without any drier unit being present. The cartridge containing the ink was wiped and primed until all nozzles were firing properly and the resultant printed image was clear and sharp. A single line of all 300 nozzles in the cartridge was then printed onto paper. The printer was switched off. After a given period of time the printer was restarted and another single line was printed without any wiping of the nozzles or maintenance to the cartridge. The quality of the most recent printed line was compared to the first printed line. If no signs of firing problems could be seen then the test was repeated using a longer time period until signs of firing problems could be seen by a deterioration in the quality of the printed line. The time for each ink to demonstrate printing (latency) problems was recorded in seconds and is tabulated in table 3. A higher value corresponds to better latency and firing characteristics. A latency of 300 seconds is considered to be a minimum acceptable latency time.

The print quality of each ink was measured. On non-porous media in particular the ink, once printed on the substrate, may tend to reticulate (draw inwards) or it may tend to wet (spread outwards). For best print quality neither of these should occur to any appreciable amount and the ink merely stays where it was when it was printed on the surface of the substrate. Each ink composition was printed onto non-porous, over-varnished, lithographic paper using the mail printer described above fitted with a 6 kW infrared drying unit. The printed inks were evaluated visually for signs of reticulation or wetting. A qualitative scoring system was used wherein at each extreme −3 represents extensive reticulation and +3 represents extensive ink wetting. The ideal value is 0 representing no ink movement but values from +1.5 to −1.5 are considered to be acceptable.

RESULTS

The print speed, latency and print quality results are tabulated in table 3.

TABLE 3

| Property | I1 | I2 | I3 | I4 | I5 | I6 | C1 | C2 | C3 | C4 |
|---|---|---|---|---|---|---|---|---|---|---|
| Print speed (feet per min) | 150 | 175 | 149 | 149 | 225 | 175 | 70 | 80 | 60 | 175 |
| Latency (seconds) | 450 | 450 | 650 | 550 | 450 | 300 | 15 | 30 | 250 | 250 |
| Print quality | −1 | −1 | −1.5 | −1 | −1 | −1 | −3 | −1 | −2 | −1 |

Table 3 shows that the print speed (drying time), print quality and especially the latency of the ink compositions of the present invention are better than the comparative inks.

The invention claimed is:

1. An ink composition comprising:
   a) 5 to 30 parts ethylene glycol mono butyl ether;
   b) 0 to 40 parts diethylene glycol mono butyl ether and/or triethylene glycol mono butyl ether;
   c) 0.1 to 20 parts pigment; and
   d) 20 to 84.9 parts water;
   wherein the ink has a viscosity of less than 50 mPa·s at a temperature of 25° C., the sum of the parts of components a)+b) is no less than 15, the sum of the parts of components a) to d) equals 100 and all parts are by weight.

2. An ink composition according to claim 1 wherein component b) is from 1 to 40 parts of diethylene glycol mono butyl ether and/or triethylene glycol monobutyl ether.

3. An ink composition according to claim 1 wherein component b) comprises diethylene glycol mono butyl ether.

4. An ink composition according to claim 1 wherein component b) is from 1 to 40 parts of diethylene glycol mono butyl ether.

5. An ink composition according to claim 1 wherein the sum of the amounts of components a)+b) is no less than 20 parts and the amount of component d) is from 20 to 79.9 parts.

6. An ink composition according to claim 1 wherein the ratio of parts of component a) to component b) is from 1:1 to 1:10 by weight.

7. An ink composition according to claim 1 additionally comprising:
   e) 0.1 to 20 parts 2-pyrrolidone, N-methyl pyrrolidone, urea, ethylene glycol, glycerol and/or propylene glycol by weight, wherein the sum of the parts of components a) to e) is 100.

8. An ink composition according to claim 7 wherein component e) comprises 2-pyrrolidone.

9. An ink composition according to claim 7 wherein component e) is from 1 to 15 parts 2-pyrrolidone by weight.

10. An ink composition according to claim 1 wherein the ratio of amounts of
    components [a)+b)] to e) is from 1:1 to 8:1.

11. An ink composition according to claim 1 additionally comprising a binder.

12. An ink composition according to claim 11 wherein the binder is a (meth)acrylate polymer.

13. An ink composition according to claim 1 additionally comprising a surfactant made from an acetylenic diol.

14. An ink composition according to claim 1 wherein the pigment is self-dispersible in water.

15. A process for printing an image on a substrate comprising applying an ink composition according to claim 1 to the substrate.

16. A process according to claim 15 wherein the printing is performed by means of an ink jet printer.

17. A process according to claim 15 wherein the substrate has no or negligible absorbency or porosity.

18. A paper, a plastic film or a textile material printed with an ink composition according to claim 1.

19. An ink jet printer cartridge comprising a chamber and an ink composition wherein the ink composition is present in the chamber and the ink composition is as claimed in claim 1.

* * * * *